United States Patent
Wang et al.

(10) Patent No.: US 9,807,847 B2
(45) Date of Patent: Oct. 31, 2017

(54) FLEXIBLE AND/OR STRETCHABLE ELECTRONIC DEVICE AND METHOD OF MANUFACTURING THEREOF

(71) Applicant: NANYANG TECHNOLOGICAL UNIVERSITY, Singapore (SG)

(72) Inventors: Jiangxin Wang, Singapore (SG); Pooi See Lee, Singapore (SG)

(73) Assignee: NANYANG TECHNOLOGICAL UNIVERSITY, Singapore (SG)

(*) Notice: Subject to any disclaimer, the term of this patent is extended or adjusted under 35 U.S.C. 154(b) by 0 days.

(21) Appl. No.: 14/830,968

(22) Filed: Aug. 20, 2015

(65) Prior Publication Data
US 2016/0057835 A1    Feb. 25, 2016

(30) Foreign Application Priority Data
Aug. 21, 2014  (SG) .......................... 10201405093X

(51) Int. Cl.
| H05B 33/26 | (2006.01) |
| H05B 33/10 | (2006.01) |
| H05B 33/14 | (2006.01) |
| G02F 1/153 | (2006.01) |
| G02F 1/1333 | (2006.01) |

(52) U.S. Cl.
CPC ............ *H05B 33/26* (2013.01); *G02F 1/153* (2013.01); *H05B 33/10* (2013.01); *H05B 33/14* (2013.01); *G02F 1/133305* (2013.01)

(58) Field of Classification Search
CPC ........ H05B 33/26; H05B 33/14; H05B 33/10; G02F 1/133305; G02F 1/155
See application file for complete search history.

(56) References Cited

PUBLICATIONS

D. Leithinger, et al., "Direct and gestural interaction with relief: a 2.5D shape display", in Proceedings of the 24th annual ACM symposium on User interface software and technology, ACM: Santa Barbara, California, USA, 2011; pp. 541-548.

M. Blackshaw et al., "Recompose: direct and gestural interaction with an actuated surface", in CHI '11 Extended Abstracts on Human Factors in Computing Systems, ACM: Vancouver, BC, Canada, 2011; pp. 1237-1242.

D. Leithinger et al., "Sublimate: state-changing virtual and physical rendering to augment interaction with shape displays", in Proceedings of the SIGCHI Conference on Human Factors in Computing Systems, ACM: Paris, France, 2013; pp. 1441-1450.

(Continued)

*Primary Examiner* — Joseph L Williams
(74) *Attorney, Agent, or Firm* — Sughrue Mion, PLLC

(57) ABSTRACT

A flexible electronic device is provided. The flexible electronic device includes a flexible dielectric substrate, a first electrode layer, a second electrode layer, a functional layer, a third electrode layer, and a capping layer. The flexible dielectric substrate has a first surface and an opposing second surface. The first electrode layer is arranged on the first surface of the flexible dielectric substrate. The second electrode layer is arranged on the second surface of the flexible dielectric substrate. The functional layer includes a light emitting layer or an electroactive layer and an electrolyte layer, arranged on the second electrode layer. The third electrode layer is arranged on the functional layer. The capping layer is arranged on the third electrode layer. A method of manufacturing the flexible electronic device is also provided.

20 Claims, 4 Drawing Sheets

(56) References Cited

PUBLICATIONS

S. Follmer et al., "inFORM: Dynamic physical Affordances and Constraints through Shape and Object Actuation", in Proceedings of the 26th annual ACM symposium on User interface software and technology, ACM: St. Andrews, Scotland, United Kingdom, 2013; pp. 417-426.

Z B. Yu et al., "Intrinsically Stretchable Polymer Light-Emitting Devices Using Carbon Nanotube-Polymer Composite Electrodes", Advanced Materials, 2011, 23, pp. 3989-3994.

J. J. Liang et al., "Elastomeric Polymer Light-emitting Devices and Displays", Nature Photonics, 2013, vol. 7, pp. 817-824.

M. S. White et al., "Ultrathin, highly flexible and stretchable PLEDs", Nature Photonics, 2013, vol. 7, pp. 811-816.

H. L. Filiatrault et al., "Stretchable Light-Emitting Electrochemical Cells Using an Elastomeric Emissive Material", Advanced Materials, 2012, vol. 24, pp. 2673-2678.

S. I. Park, , "Printed Assemblies of Inorganic Light-Emitting Diodes for Deformable and Semitransparent Displays", Science, 2009, vol. 325, pp. 977-981.

R. H. Kim et al., "Stretchable, Transparent Graphene Interconnects for Arrays of Microscale Inorganic Light Emitting Diodes on Rubber Substrates", Nano Letter, 2011, vol. 11, pp. 3881-3886.

W. Yuan et al., "Fault-Tolerant Dielectric Elastomer Actuators using Single-Walled Carbon Nanotube Electrodes", Advanced Materials, 2008, vol. 20, pp. 621-625.

R. Pelrine et al., "High-Speed Electrically Actuated Elastomers with Strain Greater Than 100%", Science, 2000, vol. 287, pp. 836-839.

G. Kofod et al., "Actuation Response of Polyacrylate Dielectric Elastomers", Journal of Intelligent Material Systems and Structures, 2003, vol. 14, pp. 787-793.

I. Koo et al., "Wearable Tactile Display Based on Soft Actuator", 2006 IEEE International Conference on Robotics and Automation (Icra), vols. 1-10, 2006, pp. 2220-2225.

M. Matysek et al., "Dielectric Elastomer Actuators for Tactile Displays", World Haptics 2009: Third Joint Eurohaptics Conference and Symposium on Haptic Interfaces for Virtual Environment and Teleoperator Systems, Proceedings, 2009, pp. 290-295.

S. H. Baeck et al., "Enhancement of Photocatalytic and Electrochromic Properties of Electrochemically Fabricated Mesoporous $WO_3$ Thin Films", Advanced Materials, 2003, vol. 15, No. 15, pp. 1269-1273.

C. Yan et al., "Stretchable and Wearable Electrochromic Devices", ACS Nano, 2014, vol. 8, No. 1, pp. 316-322.

(a)

(b)

FLEXIBLE AND/OR STRETCHABLE ELECTRONIC DEVICE AND METHOD OF MANUFACTURING THEREOF

CROSS-REFERENCE TO RELATED APPLICATION

This application claims the benefit of priority of Singapore patent application No. 10201405093X filed on 21 Aug. 2014, the content of which is incorporated herein by reference in its entirety for all purposes.

TECHNICAL FIELD

The invention relates to a flexible and/or stretchable electronic device, and a method of manufacturing the flexible and/or stretchable electronic device.

BACKGROUND

Volumetric displays which render content physically in three-dimensional (3D) form and allow tactile user interaction with digital information is of great interest for next generation display applications. Such volumetric displays are generated using a volumetric display device, which refers to a graphic display device capable of forming a visual representation of an object in three physical dimensions.

Challenges in these devices persist due to large size and weight of the systems used for generating the displays, as they impede light-weight and high resolution realization. For example, the systems used for generating the displays may be designed using arrays of large and heavy motor-driven actuators to generate the shape display, and top projectors to provide the visual display. Minimization of the motor-driven actuators down to millimeter or micrometer scale is difficult. Furthermore, the visual display which is positioned between the top projector and bottom actuator arrays is also prone to interruption due to interference of the visual display by a user.

In view of the above, there exists a need for an improved electronic device that may be used for generating volumetric displays, and methods of fabricating the electronic device that overcomes or at least alleviates one or more of the above-mentioned problems.

SUMMARY

In a first aspect, a flexible electronic device is provided. The device comprises
  a) a flexible dielectric substrate having a first surface and an opposing second surface;
  b) a first electrode layer arranged on the first surface of the flexible dielectric substrate;
  c) a second electrode layer arranged on the second surface of the flexible dielectric substrate;
  d) a functional layer comprising or consisting of (i) a light emitting layer or (ii) an electroactive layer and an electrolyte layer, arranged on the second electrode layer;
  e) a third electrode layer arranged on the functional layer; and
  f) a capping layer arranged on the third electrode layer.

In a second aspect, a method of manufacturing a flexible electronic device is provided. The method comprises
  a) providing a flexible dielectric substrate having a first surface and an opposing second surface;
  b) forming a first electrode layer on the first surface of the flexible dielectric substrate;
  c) forming a second electrode layer on the second surface of the flexible dielectric substrate;
  d) forming a functional layer comprising or consisting of (i) a light emitting layer or (ii) an electroactive layer and an electrolyte layer, on the second electrode layer;
  e) forming a third electrode layer on the functional layer; and
  f) forming a capping layer on the third electrode layer.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
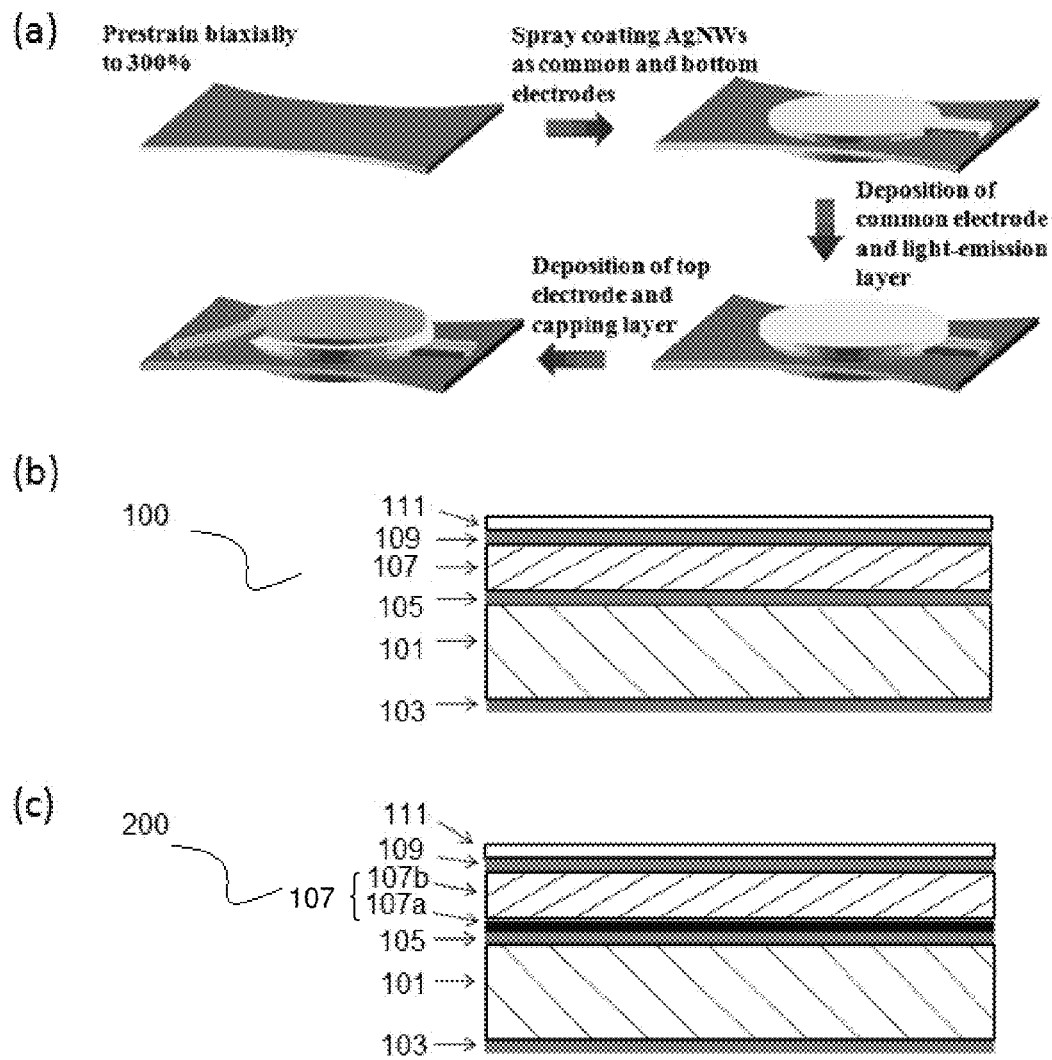
FIG. 1 shows (a) a schematic diagram interpreting the fabrication procedure of an active deformable electroluminescent (EL) device according to an embodiment; (b) a cross-sectional view of an active deformable EL device 100 according to an embodiment; and (c) a cross-sectional view of an active deformable electrochemical (EC) device 200 according to an embodiment.

In embodiments disclosed herein, a mechanical compliant electroluminescent or electrochemical device is integrated with a dielectric elastomer actuator to derive a flexible electronic device. Advantageously, functionality of the electroluminescent or electrochemical device may be maintained while complying with dimension or shape changes under electrical-driven actuation. Use of flexible and/or elastic electrodes in the form of networks of conductive nanowires embedded in a stretchable polymeric matrix, for example, addresses issues encountered by state of the art electrodes, as they provide mechanical stretchability while possessing excellent electrically conductivity and good transparency. Highly stretchable electroluminescent devices may be fabricated with a simple all-solution processible method. Methods of manufacturing the flexible electronic device disclosed herein may be scaled up easily for industrial scale applications.

With the above in mind, various embodiments refer in a first aspect to a flexible electronic device. The term "flexible" as used herein refers to materials that are compliant and respond in the presence of external forces by deforming readily. For example, the flexible electronic device may flex or bend readily upon application of a force on the material.

In various embodiments, the flexible electronic device is a stretchable electronic device. The phrase "stretchable electronic devices" refers to a type of flexible electronic devices having ability to deform elastically in response to a force such that they extend in length, width and/or other directions, and are able to return at least substantially to their original non-extended configuration after removal of the force.

The flexible electronic device comprises a flexible dielectric substrate having a first surface and an opposing second surface. The term "dielectric" refers generally to an electrically insulating material or medium, such as wood, paper, ceramics, glass, plastics, or rubber. A first electrode layer is arranged on the first surface of the flexible dielectric substrate, and a second electrode layer is arranged on the second surface of the flexible dielectric substrate. For example, the first electrode layer and the second electrode layer may be arranged directly on the flexible dielectric substrate, such that the first electrode layer and the second electrode layer are in contact with the flexible dielectric substrate. In the above-mentioned configurations, the flexible dielectric substrate having the first and second electrode layers arranged thereon may function like a dielectric elastomer actuator (DEA).

An actuator refers generally to a member that is capable of transducing or converting an electric energy or signal into a mechanical force, displacement or strain. In the context of a dielectric elastomer actuator referred to herein, the electrical energy is provided by applying a voltage across the first electrode layer and the second electrode layer. The first electrode layer, the second electrode layer, and the flexible dielectric substrate may function as a capacitor, whereby the columbic force may generate a stress termed "Maxwell stress" to draw the first and second electrode layers together by electrostatic force. In so doing, the flexible dielectric substrate sandwiched between the first electrode layer and the second electrode layer may be compressed to result in expansion of the flexible dielectric substrate in a direction perpendicular to the plane of the electrode layers. This area expansion may be used to actuate mechanical systems. Due to the flexibility and/or stretchability of the flexible dielectric substrate, upon removal of the voltage applied across the first electrode layer and the second electrode layer, the flexible dielectric substrate may return at least substantially to its original non-extended configuration.

The flexible dielectric substrate may comprise or be formed entirely of an electrically insulating material having a compliant structure operable to compress or expand in response to a voltage applied to the first electrode layer and the second electrode layer. In various embodiments, the flexible dielectric substrate comprises or consists of a dielectric polymer, such as an acrylic elastomer, silicone, fluorosilicone, fluoroelastomer, natural rubber, polybutadiene, nitrile rubber, isoprene, ethylene propylene diene, copolymers thereof, or combinations thereof.

In specific embodiments, the flexible dielectric substrate comprises or consists of an acrylic elastomer.

In various embodiments, the flexible dielectric substrate is a pre-stretched flexible dielectric substrate. As used herein, the term "pre-stretched" refers to the substrate being in a stretched position prior to or while the first electrode layer and/or the second electrode layer are formed on the substrate. By stretching the substrate and keeping it stretched before building the actuator, performance of the dielectric elastomer actuator may be improved. Advantageously, a lower voltage may be applied across the first and second electrode layers to provide the same electrostatic pressure due to a lower thickness of the flexible dielectric substrate. Compressive stresses in the plane of the flexible dielectric substrate may also be alleviated.

In various embodiments, the pre-stretched flexible dielectric substrate is stretched biaxially by an extent up to about 400% of its original length. For example, the pre-stretched flexible dielectric substrate may be stretched biaxially by an extent in the range of about 100% to about 400% of its original length, such about 150% to about 400%, about 200% to about 400%, about 300% to about 400%, about 100% to about 350%, about 100% to about 300%, about 100% to about 250%, or about 100% to about 200%. Stretching direction of the flexible dielectric substrate may be varied to achieve different mechanical outputs from the actuator.

As mentioned above, the flexible dielectric substrate is disposed between the first electrode layer and the second electrode layer. Due to the varying degrees of compression or expansion of the flexible dielectric substrate depending on the voltage applied to the first electrode layer and the second electrode layer, the first electrode layer and the second electrode layer may themselves be flexible and/or stretchable for accommodating the compression or expansion of the flexible dielectric substrate.

In various embodiments, the first electrode layer and the second electrode layer independently comprise or consist of an electrically conductive filler material. The electrically conductive filler material may be a material that allows flow of electric charges in one or more directions within or through the material. Advantageously, the electrically conductive filler material may form a network structure to allow flow of electric charges through the electrode layer, while having a compliant structure or material sufficiently pliable to accommodate compression or expansion of the underlying flexible dielectric substrate. At the same time, electrodes with good transparency may be obtained.

The first electrode layer and the second electrode layer may have the same thickness or a similar thickness. In various embodiments, the first electrode layer and the second electrode layer have independently a thickness in the range of about 50 nm to about 150 nm, such as about 75 nm to about 150 nm, about 100 nm to about 150 nm, about 50 nm to about 125 nm, about 50 nm to about 100 nm, about 75 nm to about 100 nm, or about 80 nm to about 120 nm. In specific embodiments, the first electrode layer and the second electrode layer have a similar thickness of about 100 nm.

As used herein, the term "transparent" generally refers to a material allowing light to pass through without substantial portions being absorbed. By the term "good transparency", it means that the electrode layer may have a high light transmittance value in the range from about 80% to about 100%, such as about 85% to about 100%, about 90% to about 100%, about 95% to about 100%, about 98% to about 100%, about 80% to about 95%, about 80% to about 90%, about 80% to about 85%, about 85% to about 95%, about 82% to about 92% over at least a portion of the visible light spectrum from about 400 nm to about 700 nm.

In various embodiments, the electrically conductive filler material is selected from the group consisting of a metal, a metal oxide, a semiconductor, graphene, carbon nanotubes (CNTs), or combinations thereof.

For example, the metal or metal oxide may comprise or consist of a metal selected from the group consisting of Ag, Au, Pt, Cu, Ni, Ti, Cr, Co, Fe, Al, Zn, W, V, and combinations thereof.

Suitable semiconductor include, but are not limited to, elemental nanowires such as Si, Ge, Se, Te, and the like; binary phase nanowires such as ZnS, ZnSe, ZnTe, CdS, CdSe, CdTe, InP, GaN, $Sb_2Se_3$, $ZrS_2$, $Ag_2S$, InSe, $In_2Se_3$, $Bi_2S_3$, $Zn_3P_2$, ZnO, $SnO_2$, $In_2O_3$, CdO, $V_2O_5$, $Ga_2O_3$, $Fe_2O_3$, $Cu_2O$, CuO, $CeO_2$, $TiO_2$, $SiO_2O_3$, and the like;

ternary phase nanowires such as ZnCdSe, ZnSeTe, CdZnS, $Zn_2GeO_4$, $In_2Ge_2O_7$, $ZnSnO_4$, $ZnGa_2O_4$, and the like; hybrid nanowires such as $Au/SiO_2$, $Au/Ga_2O_3$, ZnO/Si, ZnS/InP, Ge/CdS, ZnO/GaN, $RuO_2/TiO_2$, Ga/ZnS, $ZnSe/SiO_2$, Au/CdSe/Au, Si/porphyrin, CdS/PPy, ZnS/CNT, and the like; or combinations thereof.

In various embodiments, the electrically conductive filler material is an electrically conducting nanostructured material having a size in the nanometer range.

The electrically conducting nanostructured material may be in any shape. The electrically conducting nanostructured material may be selected from the group consisting of nanotubes, nanoflowers, nanowires, nanofibers, nanoflakes, nanoparticles, nanodiscs, nanofilms, and combinations thereof. In specific embodiments, the electrically conducting nanostructured material comprises or consists of nanowires.

As the electrically conducting nanostructured material may not be regular in shape, size of an electrically conducting nanostructured material is defined by a maximal length of a line segment passing through the centre and connecting two points on the periphery of the nanostructured material.

In embodiments where the electrically conductive filler material is an electrically conducting nanostructured material, the electrically conducting nanostructured material may each have a size in a range of about 10 nm to about 100 nm. For example, at least one dimension of each electrically conducting nanostructured material may have a length in the range of about 1 nm to about 100 nm, about 1 nm to about 80 nm, about 1 nm to about 60 nm, about 1 nm to about 40 nm, about 10 nm to about 100 nm, about 10 nm to about 80 nm, about 10 nm to about 60 nm, about 10 nm to about 40 nm, about 20 nm to about 80 nm, or about 30 nm to about 60 nm.

In some embodiments, the electrically conductive filler material is selected from the group consisting of metal nanowires, metal nanoparticles, carbon nanotubes, metal grids, and combinations thereof.

In specific embodiments, the electrically conductive filler material comprises or consists of silver nanowires. Advantageously, electrode layers formed of silver nanowires possess good transparency while being able to effectively accommodate and comply with stretching strains under electrical actuation through its network structure, as opposed to state of the art electrodes such as powder carbon graphite and carbon black in grease, which are not able to demonstrate these characteristics.

The flexible electronic device disclosed herein comprises a functional layer arranged on the second electrode layer. For example, the functional layer may be arranged directly on the second electrode layer, such that the functional layer is in contact with the second electrode layer. In this regard, the second electrode layer may function as a common electrode in the flexible electronic device, while the first electrode layer may function as a bottom electrode for the dielectric elastomer actuator discussed above.

As used herein, the term "functional layer" refers to a layer in the flexible electronic device that contributes directly to the functionality of the device. For example, in embodiments where the flexible electronic device is a deformable electroluminescent device, the functional layer may comprise or consist of a light emitting layer. In embodiments where the flexible electronic device is a deformable electrochemical device, the functional layer may comprise or consist of an electroactive layer and an electrolyte layer.

The functional layer comprises or consists of (i) a light emitting layer or (ii) an electroactive layer and an electrolyte layer, arranged on the second electrode layer.

In various embodiments, the functional layer comprises or consists of a light emitting layer. The light emitting layer may comprise or consist of an electroluminescent material dispersed in an elastomeric polymer matrix. Electroluminescence (EL) refers to an opto-electronic process in which a material can emit light either by the current flow within the material or light emission can also be due to charging of the molecule by the applied external field across the material. The term "electroluminescent material" as used herein refers to a material which undergoes radiative decay to emit light upon receiving energy or when activated, for example, by an applied voltage.

The electroluminescent material may be an inorganic or an organic electroluminescent material. In various embodiments, the electroluminescent material comprises or consists of an inorganic electroluminescent material. Examples of an inorganic electroluminescent material may include crystalline or non-crystalline semiconductors having a sufficiently wide bandwidth.

In various embodiments, the electroluminescent material comprises or consists of an alternating current electroluminescent material. Examples of alternating current electroluminescent material include optionally doped ZnS, optionally doped CdS, optionally doped CaS, optionally doped SrS, and combinations thereof. Different dopants and doping concentrations may be used. Examples of dopants include magnesium, cobalt, silver, aluminum, and/or cadmium. Two or more of the above dopants may be used as co-dopants. In various embodiments, doping concentration is in the range of about 0.01 mol % to about 0.1 mol %, such as about 0.05 mol % to about 0.1 mol %, about 0.01 mol % to about 0.05 mol %, about 0.03 mol % to about 0.08 mol %, or about 0.02 mol % to about 0.07 mol %. In specific embodiments, the electroluminescent material comprises or consists of copper doped ZnS.

In addition, or alternatively, the electroluminescent material may be an organic electroluminescent material. Examples of an organic electroluminescent material include an electroluminescent conjugated polymer such as, but not limited to, polyfluorenes, polyphenylene vinylenes, polyphenylene ethynylenes, polyvinyl carbazole, polythiophenes, polypyridines, poly(pyridyl vinylenes), polyphenylenes, polyanthracenes, polyspiro compounds, copolymers thereof, and combinations thereof.

In various embodiments, the organic electroluminescent material is a fluorescent polymer with alternating current field-induced emission such as poly(p-phenylene vinylene) (PPV), poly(9,9-di-n-octylfluorenyl-2,7-diyl) (PFO) and poly (N-vinylcarbazole) (PVK), copolymers thereof, combinations thereof, and their organic/inorganic composites.

In various embodiments, the electroluminescent material is selected from the group consisting of an alternating current electroluminescent material, a fluorescent polymer with alternating current field-induced emission, composites thereof, and combinations thereof.

The electroluminescent material may be dispersed in an elastomeric polymer matrix. The term "elastomeric" as used herein refers to a material which is able to undergo deformation or expansion upon application of a force, and to recover its previous size and shape after the deformation or expansion. By dispersing the electroluminescent material in the elastomeric polymer, with the elastomeric polymer forming a matrix within which the electroluminescent material is dispersed, the light emitting layer may be rendered flexible and sufficiently pliable to accommodate compression or expansion of the underlying structure.

In various embodiments, the elastomeric polymer comprises or consists of polysiloxanes, polyepoxides, polysulfide rubber, polyurethanes, silicone, polyacrylic, and combinations thereof. In specific embodiments, the elastomeric polymer comprises or consists of silicone, such as platinum-catalyzed silicone.

Thickness of the light emitting layer may be in the range of about 40 µm to about 200 µm. For example, thickness of the light emitting layer may be in the range of about 60 µm to about 200 µm, about 100 µm to about 200 µm, about 150 µm to about 200 µm, about 40 µm to about 150 µm, about 40 µm to about 120 µm, about 40 µm to about 100 µm, about 40 µm to about 80 µm, about 80 µm to about 150 µm, or about 60 µm to about 120 µm.

In addition to, or apart from the above, the functional layer may comprise or consist of an electroactive layer and an electrolyte layer. As used herein, the term "electro active" refers to the electrochemical property of a material pertaining to hole transport/injection property, electron transport/injection property and/or photosensitivity.

In various embodiments, the electroactive layer comprises or consists of an electrochromic active material. The term "electrochromic active material" as used herein refers to a material that is able to reversibly change its optical properties, such as color and/or opacity, due to insertion or extraction of charge carriers such as ions in the material. An electrochromic active material may, for example, change from a colored state to being transparent upon application of a voltage across the material. By varying the voltage applied across the electrochromic active material, a complete set of tones may be obtained. The electrochromic active material may additionally or alternatively change between an opaque state, a translucent state, and a transparent state.

Examples of electrochromic active materials include transition metal oxides, molecular dyes, and conducting polymers.

Transition metal oxides that function as electrochromic active materials may include an oxide of scandium (Sc), titanium (Ti), vanadium (V), chromium (Cr), manganese (Mn), iron (Fe), cobalt (Co), nickel (Ni), copper (Cu), zinc (Zn), and alloys thereof. Specific examples of transition metal oxides that may function as electrochromic active materials include tungsten oxide ($WO_3$), nickel oxide (NiO), vanadium oxide ($V_2O_5$), titanium oxide ($TiO_2$), molybdenum oxide ($MoO_3$), and combinations thereof.

Molecular dyes that may function as electrochromic active materials include viologens such as 1,1'-diethyl-4,4' dipyridilium dichloride (also known as ethyl viologen or EV), and 1,1'-dimethyl-4,4' dipyridilium dichloride (also known as methyl viologen, or MV).

Examples of conducting polymers include, but are not limited to, polyacetylene, polyaniline, polythiophene, polypyrrole, polyarylene, polyphenylene, poly(bisthiophenephenylene), poly-methylpyrrole, conjugated ladder polymer, poly(arylene vinylene), poly(arylene ethynylene), polymers containing viologen moieties, such as poly(butanyl viologen), derivatives thereof, copolymers thereof, and combinations thereof.

As used herein, "derivative" refers to a chemically modified version of a chemical compound that is structurally similar to a parent compound, and which is actually or theoretically derivable from that parent compound. Derivatization may involve substitution of one or more moieties within the molecule, such as a change in functional group. A derivative may or may not have the same chemical and/or physical properties of the parent compound. For example, the derivative may be more hydrophilic, or it may have altered reactivity as compared to the parent compound.

In various embodiments, the electroactive layer comprises or consists of transition metal oxides. In specific embodiments, the electroactive layer comprises or consists of $WO_3$ particles.

An electrolyte layer is arranged on or directly on the elctroactive layer. The term "electrolyte" as used herein refers to an ionic conductor which may be in a solid state, including in a gel form. In various embodiments, the electrolyte layer comprises or consists of a gel electrolyte. Examples of gel electrolyte include, but are not limited to, polyacrylonitrile (PAN), polyethylene oxide (PEO), polyvinylidene fluoride (PVDF), poly(methyl methacrylate) (PMMA), copolymers thereof, or combinations thereof.

As mentioned above, color and/or opacity changes in an electrochromic active material may be effected by ions entering and leaving the electrochromic active material. In embodiments where the electroactive layer comprises or consists of an electrochromic active material, arranging the electrolyte layer and the electroactive layer such that they are in direct contact allows the electrolyte layer to be in an ion-transfer relationship with the electrochromic active material, thereby functioning as an ion-conductor to complete an electrical circuit to facilitate color and/or opacity changes in the electrochromic active material.

Thickness of the electroactive layer may be in the range of about 50 nm to about 200 nm, such as about 80 nm to about 200 nm, about 100 nm to about 200 nm, about 120 nm to about 200 nm, about 150 nm to about 200 nm, about 50 nm to about 150 nm, about 50 nm to about 120 nm, about 50 nm to about 100 nm, about 50 nm to about 80 nm, about 100 nm to about 150 nm, or about 80 nm to about 120 nm.

Thickness of the electrolyte layer, on the other hand, may be in the range of about 10 µm to about 500 µm, such as about 50 µm to about 500 µµm, about 100 µm to about 500 µm, about 150 µm to about 500 µm, about 200 µm to about 500 µm, about 250 µm to about 500 µm, about 300 µm to about 500 µm, about 10 µm to about 400 µm, about 10 µm to about 300 µm, about 10 µm to about 250 µm, about 10 µm to about 100 µm, about 10 µm to about 80 µm, about 100 µm to about 300 µm, or about 150 µm to about 250 µm.

The flexible electronic device further comprises a third electrode layer arranged on the functional layer. The third electrode layer may serve as a top electrode for the functional layer in the flexible electronic device, while the second electrolyte layer may function as the common electrode and the first electrode layer as a bottom electrode for the dielectric elastomer actuator discussed above. As in the case for the first electrode layer and the second electrode layer, the third electrode layer may comprise or consist of an electrically conductive filler material. Examples of suitable electrically conductive filler material have already been discussed above.

Thickness of the third electrode layer may be the same as or similar to that of the first electrode layer and/or the second electrode layer. For example, thickness of the third electrode layer may be in the range of about 50 nm to about 150 nm, such as about 75 nm to about 150 nm, about 100 nm to about 150 nm, about 50 nm to about 125 nm, about 50 nm to about 100 nm, about 75 nm to about 100 nm, or about 80 nm to about 120 nm. In specific embodiments, the third electrode layer may have a thickness of about 100 nm.

A capping layer is arranged on the third electrode layer. The capping layer may serve to complete the flexible electronic device, and may serve to constrain and to protect the third electrode layer so that conductivity of the third electrode layer may be maintained during or when undergoing mechanical deformations. In addition, the capping layer may isolate the device structure from moisture so as to protect electroluminescent materials comprised in the functional layer against moisture which may otherwise react with the moisture and quench their luminescence.

In various embodiments, the capping layer comprises or consists of an elastomeric polymer. Examples of suitable elastomeric polymers have already been discussed above. In various embodiments, the capping layer may comprise or consist of silicone. Thickness of the capping layer may be in the range of about 10 µm to about 30 µm, such as in the range of about 15 µm to about 30 µm, about 20 µm to about 30 µm, about 25 µm to about 30 µm, about 10 µm to about 25 µm, about 10 µm to about 20 µm, about 10 µm to about 15 µm, about 15 µm to about 25 µm, or about 20 µm to about 25 µm. In various embodiments, no other layers are arranged on top of the capping layer.

The flexible electronic device disclosed herein may be actuated symmetrically in the lateral direction. Other actuations, such as orthogonal extrusion from the device surface, may also be achieved. The flexible electronic device disclosed herein may be used to fabricate stretchable electroluminescent devices which may be seamlessly attached onto curvilinear surfaces or non-planar surfaces for example, making them suitable for conformable illumination and lighting purposes. Furthermore, the flexible electronic device disclosed herein may be used to form light weight, portable, and miniaturized electroluminescent devices, which may be used for volumetric display and other applications.

Various embodiments relate in a second aspect to a method of manufacturing a flexible electronic device. The method comprises providing a flexible dielectric substrate having a first surface and an opposing second surface, forming a first electrode layer on the first surface of the flexible dielectric substrate, and forming a second electrode layer on the second surface of the flexible dielectric substrate. Examples of suitable flexible dielectric substrate, first electrode layer and second electrode layer have already been discussed above.

In various embodiments, providing the flexible substrate having a first surface and an opposing second surface comprises stretching the flexible dielectric substrate biaxially by an extent in the range of about 100% to about 400% of its original length. As mentioned above, this allows the flexible dielectric substrate to be in a stretched position prior to or while the first electrode layer and the second electrode layer are formed on the substrate, which may advantageously lower the voltage requirements across the first and second electrode layers for providing the same electrostatic pressure.

Forming the first electrode layer and second electrode layer may comprise depositing a suspension comprising an electrically conductive filler material on their respective underlying surface. Depositing the suspension may be carried out at atmospheric conditions and by any suitable thin film formation methods, such as roller coating, curtain coating, spin coating, spray coating, screen printing, wet printing, or a combination of the aforementioned methods.

Examples of suitable electrically conductive filler material have already been discussed above. In specific embodiments, the electrically conductive filler material comprises or consists of silver nanowires.

The electrically conductive filler material may be dispersed in a liquid that does not interact chemically with, or does not dissolve the electrically conductive filler material.

In various embodiments, the liquid comprises or consists of an alcohol-based solvent. Examples of an alcohol-based solvent include, but are not limited to, methanol, ethanol, and isopropyl alcohol. In various embodiments, the electrically conductive filler material is suspended in isopropyl alcohol. The resultant suspension may have a concentration in the range of about 0.1 mg/ml to about 1 mg/ml, such as about 0.5 mg/ml to about 1 mg/ml, about 0.1 mg/ml to about 0.5 mg/ml, or about 0.25 mg/ml to about 0.75 mg/ml.

The suspension comprising the electrically conductive filler material may be well dispersed. In various embodiments, methods such as agitation, stirring or sonication may be used to disperse the electrically conductive filler material in the suspension.

The method disclosed herein includes forming a functional layer comprising or consisting of (i) a light emitting layer or (ii) an electroactive layer and an electrolyte layer, on the second electrode layer. Examples of functional layer, light emitting layer, electroactive layer and an electrolyte layer have already been mentioned above.

In various embodiments, the functional layer comprises or consists of a light emitting layer. Forming the functional layer on the second electrode layer may comprise depositing a mixture comprising an electroluminescent material and an elastomeric polymer on the second electrode layer. Suitable depositing methods may include any thin film formation methods, such as spray coating. Electroluminescent material and elastomeric polymers such as those mentioned above may be used. In various embodiments, the electroluminescent material comprises or consists of copper doped ZnS. The electroluminescent material may be dispersed in an elastomeric polymer matrix in the weight ratio in the range of about 1:2 to about 3:1.

In addition, or as an alternative to the above, the functional layer comprises or consists of an electroactive layer and an electrolyte layer. Forming the functional layer on the second electrode layer may comprise depositing a suspension comprising an electroactive material on the second electrode layer to obtain the electroactive layer, and depositing an electrolyte on the electroactive layer to obtain the electrolyte layer. Examples of electroactive material and electrolyte such as that mentioned above may be used.

The method of manufacturing a flexible electronic device includes forming a third electrode layer on the functional layer, and forming a capping layer on the third electrode layer. The capping layer may be prepared using an elastomeric polymer in liquid form without requiring the use of a solvent.

Advantageously, the first electrode layer, second electrode layer and third electrode layer, functional layer, and capping layer may independently be processed at ambient conditions or at room temperature of about 25° C.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

Experimental Section

Various embodiments refer to a stretchable electroluminescent/electrochemical device for 3D or volumetric display.

In the embodiment shown in FIG. 1(a), the device fabrication starts with a 3M VHB poly(acrylic) substrate prestrained biaxially to 300%. The 3M VHB film may be stretched to different strains from 0% to 400% while the stretching direction can also be varied to achieve different mechanical output from the actuator. Silver nanowires (AgNWs) were spray-coated on both sides of the prestrained film/substrate, working as the common and bottom electrodes for the DEAs.

Other conductive fillers such as metal grids, carbon nanotubes (CNTs) and silver nanoparticle self-assembled rings may also be used for the stretchable and transparent electrode fabrication. Compared to conventional electrodes such as powder carbon graphite and carbon black in grease, the AgNW films may effectively accommodate and comply with the stretching strains by the network structure under electrical actuation. With the highly conductive metallic nanowires, a thin AgNW layer with good transparency can effectively provide the conduction pathway for the devices which can obtain large area strain. AC EL particles (e.g. ZnS:Cu particles) mixed with platinum-catalyzed silicone was spun onto the common electrode as the light-emitting layers. Compared to conventional EL devices fabrication, the solution processible and printable method utilized here possesses attractive advantages with its simple procedures, large area and lightweight processability. The mature AC EL devices technologies deliver good contrast and brightness with uniform emission. Top electrode (spray-coated AgNWs) for the EL device and silicone capping layer were deposited subsequently to complete the device fabrication. The fabrication procedure can also be applied to fabricate EC devices which can be deformed and actuated electrically. Small modification during the fabrication process is required to achieve the EC device.

FIG. 1(b) shows a cross-sectional view of an active deformable electroluminescent (EL) device 100 according to an embodiment. Referring to the figure, a flexible dielectric substrate 101 having a first surface and an opposing second surface is shown. A first electrode layer 103 is arranged on the first surface of the flexible dielectric substrate 101, while a second electrode layer 105 is arranged on the second surface of the flexible dielectric substrate 101. A functional layer 107, in this case a light emitting layer, is arranged on the second electrode layer 105. A third electrode layer 109 is arranged on the functional layer 107, and a capping layer 111 is arranged on the third electrode layer 109.

FIG. 1(c) shows a cross-sectional view of an active deformable electrochemical (EC) device 200 according to an embodiment. Referring to the figure, a flexible dielectric substrate 101 having a first surface and an opposing second surface is shown. A first electrode layer 103 is arranged on the first surface of the flexible dielectric substrate 101, while a second electrode layer 105 is arranged on the second surface of the flexible dielectric substrate 101. A functional layer 107 comprising in this case, an electroactive layer 107a and an electrolyte layer 107b, is shown. The electroactive layer 107a is arranged on the second electrode layer 105, and the electrolyte layer 107b is arranged on the electroactive layer 107a. A third electrode layer 109 is arranged on the functional layer 107, and a capping layer 111 is arranged on the third electrode layer 109.

As shown in FIG. 1(c), apart from the functional layer 107 being formed of an electroactive layer 107a and an electrolyte layer 107b, the other device configurations remain the same as the active deformable EL devices.

Figure 2:
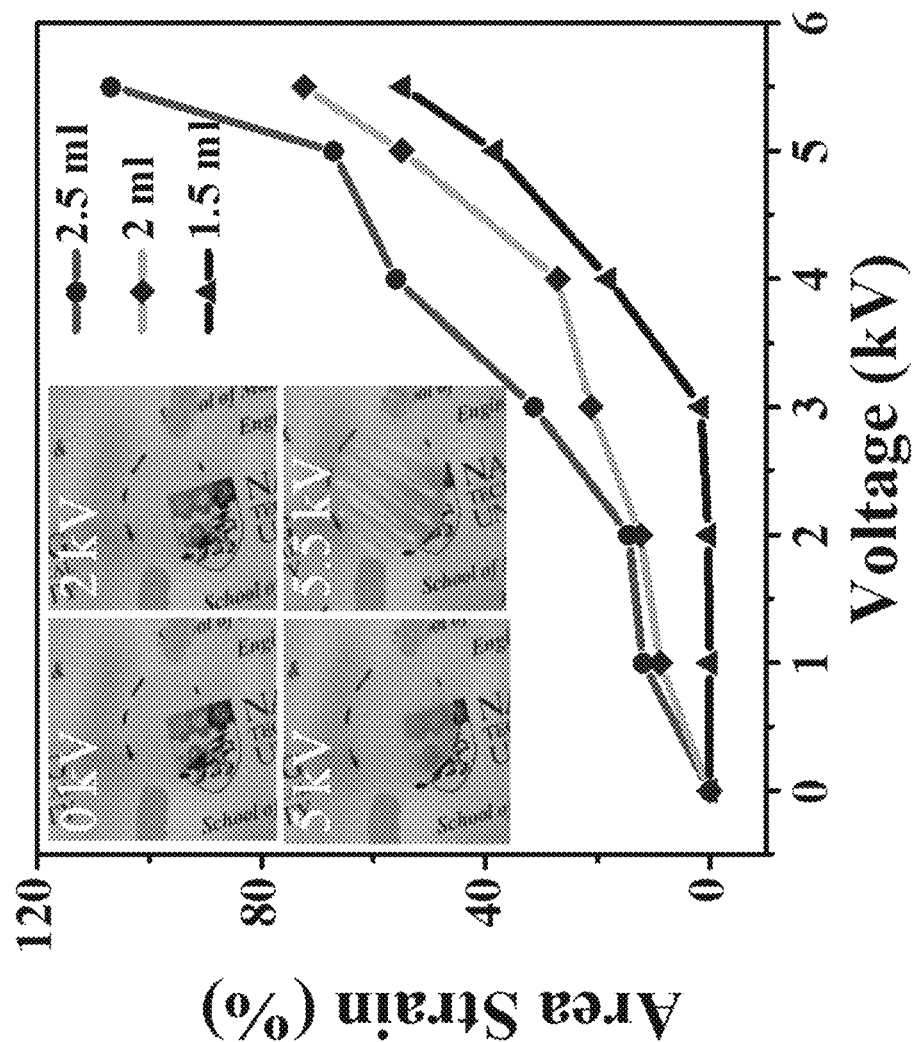
FIG. 2 shows (a) electrical actuation performance test of the actuator with different amount of silver nanowires (Ag-NWs); and (b) actuation performance test of the active deformable EL devices.
Figure 2:
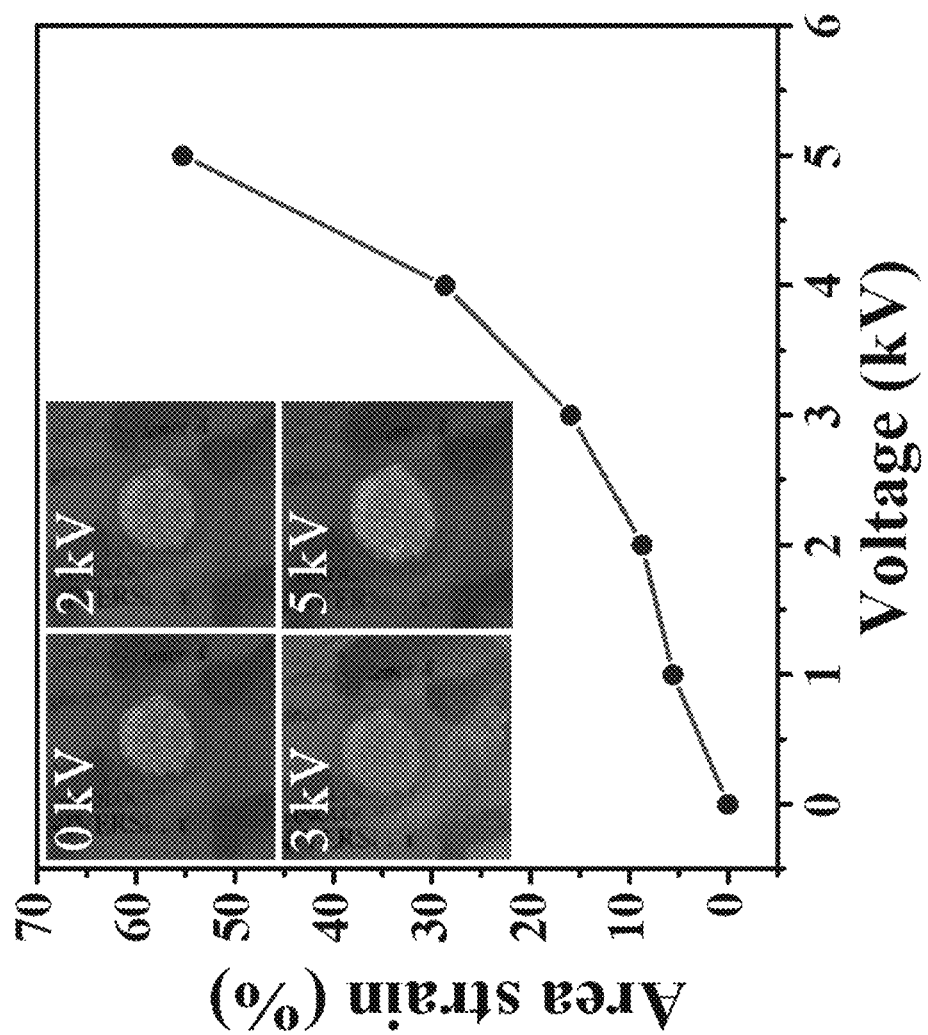

Different amount of AgNWs was used in the device fabrication to study the effects on the devices' actuation performance. AgNWs with the concentration of 0.3 mg/ml was used while the solution volumes were varied from 1.5 ml to 2.5 ml to fabricate the DEA electrodes in the same dimension. As shown in FIG. 2(a), more AgNWs contributed to larger area expansion in the electrical actuation test. Under electrical actuating, the device with more AgNWs will maintain the conductivity at higher area expansion. As can be seen in the inset photograph in FIG. 2(a), the actuator fabricated with 2.5 ml AgNWs solution showed area expansion of 67% at the voltage of 5 kV and increased above 106% at the voltage of 5.5 kV (buckling existed in the actuator along the direction of the silver paste electrodes which were used to connected to the input, indicating that area expansion was undervalued). The area strain increased from about 54%, 72% and 106% with the solution volume of 1.5 ml, 2 ml and 2.5 ml respectively. Actuation performance of the elastic EL devices was examined and presented in FIG. 2(b).

The EL device was powered with a rectangular pulse function (pulse voltage of +/− 120 V, frequency of 5 kHz). The EL device was kept in the on-state and actuated under different bias voltage. The area expansion increased with the ramping voltage. The increase trend is similar to the actuator without integrated EL device but with decreased expansion magnitude. It can be attributed to the existence of the additional layers of the EL devices which hinder the actuation behavior. With the constant Maxwell stress ($p = \epsilon \epsilon_0 E^2$) under the same voltage, the polymer expansion is reciprocal to the device elastic modulus. Consequently, the area strain reduces with the increased elastic modulus caused by the introduced EL layers.

Figure 3:
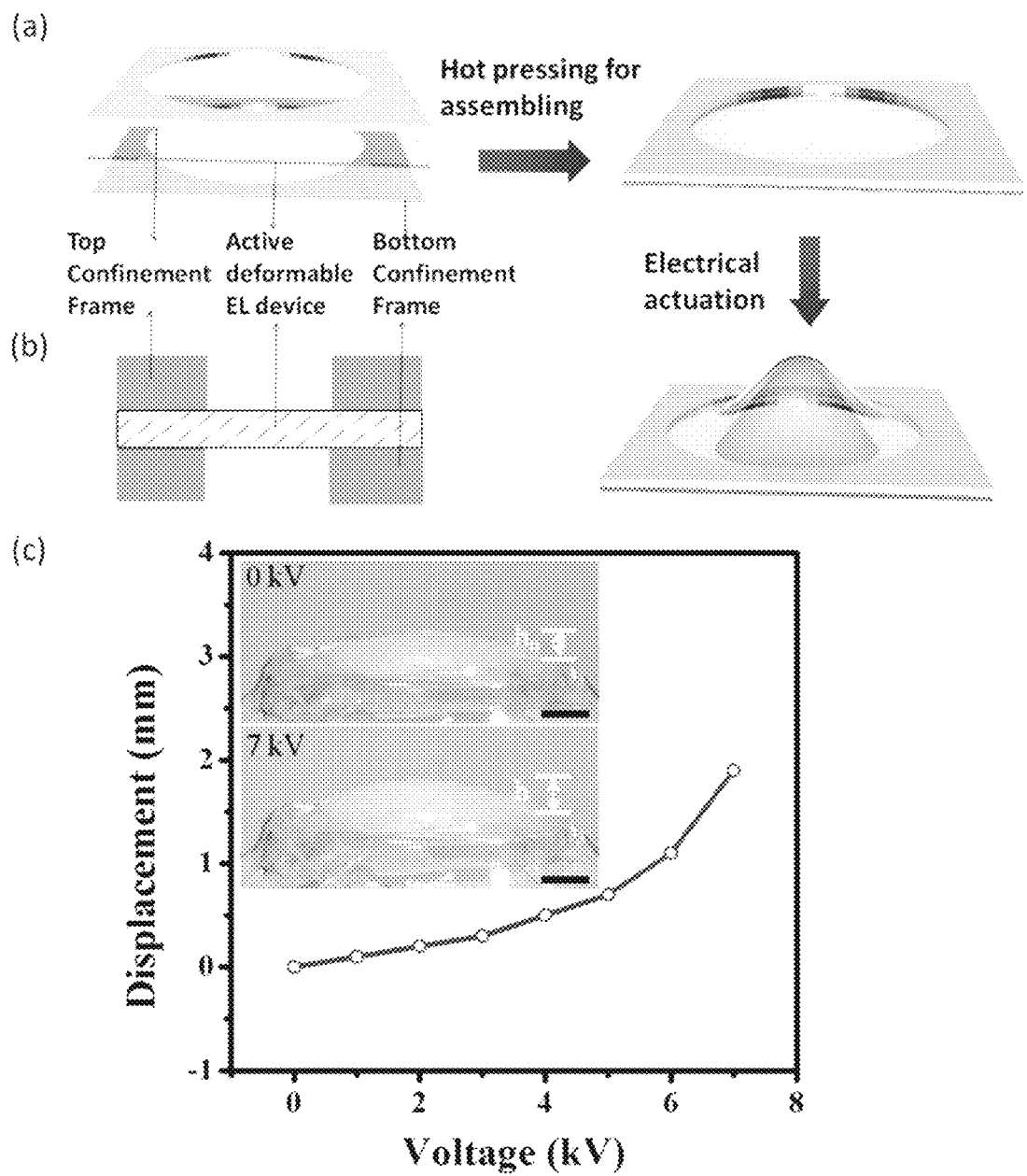
FIG. 3 shows (a) a schematic procedure of integrating the active deformable EL device with confinement frames; (b) a cross-sectional view of the integrated device; (c) a dielectric elastomer actuator (DEA) showing vertical displacements under different voltages with a constant tension below the device. Insets are the photographs of the DEA under electrical bias of 0 V and 7 kV. The scale bars depict 10 mm.

A stretchable EL device which can be actuated symmetrically in the lateral direction has been demonstrated herein. Other mechanical actuations, such as orthogonal extrusion from the device surface, may also be achieved by configuring the actuators to extract the desired mechanical output. FIG. 3(a) shows the proposed procedure to integrate the active deformable EL device with confinement frames. The rigid boundaries from the confinement frames will cause the DEAs to convex or "buckle" to release the mechanical output in the dielectric films under electrical actuation. As a result, orthogonal displacement for the active deformable EL device can be accomplished. For demonstration, a DEA device was fabricated with the method described above. A constant and small tension was maintained below the DEA. Under electrical bias, the DEA protruded to accommodate the area strains induced by the electrical bias, leading to increase in the vertical displacements. Under the electrical bias of 7 kV, the displacement of the DEA reached 1.9 mm.

In summary, a novel active deformable EL device by integrating the intrinsically stretchable light-emitting devices with DEAs has been demonstrated. DEAs, with their intrinsic stretchability, ease of minimization, high power density and low-cost fabrication, have demonstrated good mechanical actuation performance with area strain reaching around 200% on prestrained elastomers. As disclosed herein, the DEAs have been found to be excellent components which may be integrated with the stretchable EL devices to fabricate active deformable EL devices.

The soft EL device is able to achieve about 60% area strain with an actuated voltage of 5 kV. The fabrication procedure developed herein meets the requirements to fabricated light-weight and minimized EL elements for volumetric display and other applications. The developed method may also be used to fabricate stretchable EL devices which may be seamlessly attached onto curvilinear surfaces, making them promising candidates for conformable illumination and lighting purposes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flexible electronic device comprising
a) a flexible dielectric substrate having a first surface and an opposing second surface;
b) a first electrode layer arranged on the first surface of the flexible dielectric substrate;
c) a second electrode layer arranged on the second surface of the flexible dielectric substrate;
d) a functional layer comprising (i) a light emitting layer or (ii) an electroactive layer and an electrolyte layer, arranged on the second electrode layer;
e) a third electrode layer arranged on the functional layer; and
f) a capping layer arranged on the third electrode layer.

2. The flexible electronic device according to claim 1, wherein the light emitting layer comprises an electroluminescent material dispersed in an elastomeric polymer matrix.

3. The flexible electronic device according to claim 2, wherein the electroluminescent material is selected from the group consisting of an alternating current electroluminescent material, a fluorescent polymer with alternating current field-induced emission, composites thereof, and combinations thereof.

4. The flexible electronic device according to claim 3, wherein the alternating current electroluminescent material is selected from the group consisting of optionally doped ZnS, optionally doped CdS, optionally doped CaS, optionally doped SrS, and combinations thereof.

5. The flexible electronic device according to claim 3, wherein the alternating current electroluminescent material comprises copper doped ZnS.

6. The flexible electronic device according to claim 3, wherein the fluorescent polymer with alternating current field-induced emission is selected from the group consisting of poly(p-phenylene vinylene), poly(9,9-di-n-octylfluorenyl-2,7-diyl), poly(N-vinylcarbazole), copolymers thereof, and combinations thereof.

7. The flexible electronic device according to claim 2, wherein the elastomeric polymer comprises silicone.

8. The flexible electronic device according to claim 1, wherein the electroactive layer comprises an electrochromic active material.

9. The flexible electronic device according to claim 1, wherein the electrolyte layer comprises a gel electrolyte.

10. The flexible electronic device according to claim 1, wherein the flexible dielectric substrate is a pre-stretched flexible dielectric substrate stretched biaxially by an extent in the range of about 100% to about 400% of its original length.

11. The flexible electronic device according to claim 1, wherein the first electrode layer, the second electrode layer and the third electrode layer independently comprises an electrically conductive filler material.

12. The flexible electronic device according to claim 11, wherein the electrically conductive filler material is selected from the group consisting of metal nanowires, metal nanoparticles, carbon nanotubes, metal grids, and combinations thereof.

13. The flexible electronic device according to claim 11, wherein the electrically conductive filler material comprises silver nanowires.

14. A method of manufacturing a flexible electronic device, the method comprising
a) providing a flexible dielectric substrate having a first surface and an opposing second surface;
b) forming a first electrode layer on the first surface of the flexible dielectric substrate;
c) forming a second electrode layer on the second surface of the flexible dielectric substrate;
d) forming a functional layer comprising (i) a light emitting layer or (ii) an electroactive layer and an electrolyte layer, on the second electrode layer;
e) forming a third electrode layer on the functional layer; and
f) forming a capping layer on the third electrode layer.

15. The method according to claim 14, wherein providing the flexible dielectric substrate having a first surface and an opposing second surface comprises stretching the flexible dielectric substrate biaxially by an extent in the range of about 100% to about 400% of its original length.

16. The method according to claim 14, wherein forming the first electrode layer, the second electrode layer, and the third electrode layer comprises depositing a suspension comprising an electrically conductive filler material on their respective underlying surface.

17. The method according to claim 16, wherein the electrically conductive filler material comprises silver nanowires.

18. The method according to claim 14, wherein the functional layer comprises a light emitting layer, and forming the functional layer on the second electrode layer comprises depositing a mixture comprising an electroluminescent material and an elastomeric polymer on the second electrode layer.

19. The method according to claim 18, wherein the electroluminescent material comprises copper doped ZnS.

20. The method according to claim 14, wherein the functional layer comprises an electroactive layer and an electrolyte layer, and forming the functional layer on the second electrode layer comprises depositing a suspension comprising an electroactive material on the second electrode layer to obtain the electroactive layer, and depositing an electrolyte on the electroactive layer to obtain the electrolyte layer.

* * * * *